US012046237B2

(12) United States Patent
Zhu

(10) Patent No.: US 12,046,237 B2
(45) Date of Patent: Jul. 23, 2024

(54) SPEECH INTERACTION METHOD AND APPARATUS, COMPUTER READABLE STORAGE MEDIUM AND ELECTRONIC DEVICE

(71) Applicant: Shenzhen Horizon Robotics Technology Co., Ltd., Shenzhen (CN)

(72) Inventor: Changbao Zhu, Shenzhen (CN)

(73) Assignee: Shenzhen Horizon Robotics Technology Co., Ltd., Shenzhen (CN)

(*) Notice: Subject to any disclaimer, the term of this patent is extended or adjusted under 35 U.S.C. 154(b) by 417 days.

(21) Appl. No.: 17/509,548

(22) Filed: Oct. 25, 2021

(65) Prior Publication Data

US 2022/0139389 A1     May 5, 2022

(30) Foreign Application Priority Data

Nov. 4, 2020   (CN) .......................... 202011215655.2

(51) Int. Cl.
G10L 15/22     (2006.01)
G10L 15/25     (2013.01)

(52) U.S. Cl.
CPC .............. G10L 15/22 (2013.01); G10L 15/25 (2013.01)

(58) Field of Classification Search
CPC ... G10L 15/22; G10L 15/25; G10L 2015/223; G10L 2015/226; G10L 15/063; G10L 15/26; G06F 3/167; G06N 20/00
See application file for complete search history.

(56) References Cited

U.S. PATENT DOCUMENTS 9,445,174 B2 *   9/2016   Virolainen ............. H04R 1/406
2010/0198990 A1 *  8/2010   Shimada ................ H04N 7/152
                                                          709/246
(Continued)

FOREIGN PATENT DOCUMENTS

CN    109545219 A    3/2019
CN    110223690 A    9/2019
(Continued)

OTHER PUBLICATIONS

First Office Action and Search Report for corresponding Chinese Patent Application No. 202011215655.2 mailed on Aug. 29, 2023, and its English translation, 19 pages.

*Primary Examiner* — Linda Wong
(74) *Attorney, Agent, or Firm* — Bret E. Field; Bozicevic, Field & Francis LLP

(57) ABSTRACT

Embodiments of the present disclosure disclose a speech interaction method and apparatus. The method includes: acquiring videos shot by a camera device in a target space and at least one channel of audio acquired by at least one audio acquisition device; determining to-be-recognized audio that respectively corresponds to each of the sound areas in the target space based on the at least one channel of audio; determining a target sound area from the target space based on the video and at least one channel of to-be-recognized audio; performing speech recognition on the at least one channel of to-be-recognized audio to obtain a recognition result; and controlling a speech interaction-targeting device in the target sound area for speech interaction in a preset mode according to the recognition result. The speech interaction method and apparatus in the embodiments of the present disclosure may detect a target object by the method of integration of an image and speech, a speech control mode corresponding to the target object is automatically entered according to a detection result, making objects (Continued)

on the speech recognition and corresponding speech control for various types more targeted, and helping to avoid misoperation caused by recognized sound of the target object during speech control.

17 Claims, 9 Drawing Sheets

(56) References Cited

U.S. PATENT DOCUMENTS

2015/0256928 A1\* 9/2015 Mizuno ................. G01S 15/325
    381/56
2021/0358492 A1\* 11/2021 Kim ..................... B60W 50/10

FOREIGN PATENT DOCUMENTS

| | | | |
|---|---|---|---|
| CN | 111640428 A | | 9/2020 |
| CN | 111768776 A | \* | 10/2020 |
| CN | 111768776 A | | 10/2020 |
| CN | 111833899 A | | 10/2020 |

\* cited by examiner

Performing target object recognition on an image frame in the video so as to obtain a first recognition result that respectively corresponds to each of the sound areas in the target space — 2031

Determining the target sound area from the target space based on the first recognition result that respectively corresponds to each of the sound areas — 2032

SPEECH INTERACTION METHOD AND APPARATUS, COMPUTER READABLE STORAGE MEDIUM AND ELECTRONIC DEVICE

CROSS-REFERENCES TO RELATED APPLICATION

The present application claims priority under 35 U.S.C. § 119(a) to Chinese patent application No. 202011215655.2, filed on Nov. 4, 2020, which is incorporated herein by reference in its entirety as set forth in full.

TECHNICAL FIELD

The present disclosure relates to the technical field of computers, and particularly relates to a speech interaction method and apparatus, a computer readable storage medium and an electronic device.

BACKGROUND

In recent years, with the continual promotion of speech products, speech input serving as an important man-machine interaction means has been accepted by more and more people. For example, in the field of intelligent vehicles, speech control serving as one of performances of the automobile intelligentization is valued significantly. Through the function of the speech control, manual manipulation of a user may be saved, and the automobile can be controlled to execute specific operations by utilizing speech only, such as operations of turning one or off an air conditioner, setting navigation, modifying the navigation and turning on music, thereby greatly improving use experience of the user.

SUMMARY

Embodiments of the present disclosure provide a speech interaction method and apparatus, a computer readable storage medium and an electronic device.

The embodiments of the present disclosure provide a speech interaction method. The method includes: acquiring videos shot by a camera device in a target space and at least one channel of audio acquired by at least one audio acquisition device; determining to-be-recognized audio that respectively corresponds to each of the sound areas in the target space based on the at least one channel of audio; determining a target sound area from the target space based on the video and at least one channel of to-be-recognized audio; performing speech recognition on the at least one channel of to-be-recognized audio to obtain a recognition result; and controlling a speech interaction-targeting device in the target sound area for speech interaction in a preset mode according to the recognition result.

According to another aspect in the embodiments of the present disclosure, a speech interaction apparatus is provided. The apparatus includes: an acquirement module, used for acquiring videos shot by a camera device in a target space and at least one channel of audio acquired by at least one audio acquisition device; a first determination module, configured for determining the to-be-recognized audio that respectively corresponds to each of the sound areas in the target space based on the at least one channel of audio; a second determination module, configured for determining a target sound area from the target space based on the video and at least one channel of to-be-recognized audio; a recognition module, configured for performing speech recognition on the at least one channel of to-be-recognized audio to obtain a recognition result; and a control module, configured for controlling a speech interaction-targeting device in the target sound area for speech interaction in a preset mode according to the recognition result.

According to another aspect in the embodiments of the present disclosure, a computer readable storage medium is provided, storing computer programs. The computer programs are configured for performing the above speech interaction method.

According to another aspect in the embodiments of the present disclosure, an electronic device is provided. The electronic device includes: a processor; a memory configured for storing an executable instruction for the processor; and a processor configured for reading the executable instruction from the memory and executing the instruction to realize the above speech interaction method.

Based on the speech interaction method and apparatus, the computer readable storage medium and the electronic device provided in the embodiments of the present disclosure, for the target space, the spot videos and the acquired audio are obtained; the videos and the audio are recognized jointly so as to determine the target sound area; then a speech recognition is performed on the audio so as to obtain the recognition result; and finally, the speech interaction-targeting device in the target sound area is controlled for speech interaction in the preset mode according to the recognition result. Thus, the speech interaction method and apparatus in the embodiments of the present disclosure may detect a target object by the method of integration of an image and speech, a speech control mode corresponding to the target object is automatically entered according to a detection result, making objects on the speech recognition and corresponding speech control for various types more targeted, and helping to avoid misoperation caused by recognized sound of the target object during speech control.

Technical solutions of the present disclosure will be further described below in detail by virtue of drawings and embodiments.

BRIEF DESCRIPTION OF DRAWINGS

Embodiments of the present disclosure will be described in detail with reference to drawings. The above and other purposes, features and advantages of the present disclosure will be more distinct. The drawings are provided so that the embodiments in the present disclosure may be understood well, and formed, as one part of the description, for explaining the present disclosure together with the embodiments of the present disclosure, rather than forming a limitation to the present disclosure. In the drawings, identical reference signs generally indicate identical components or steps.

DETAILED DESCRIPTION OF THE EMBODIMENTS

Figure 1:
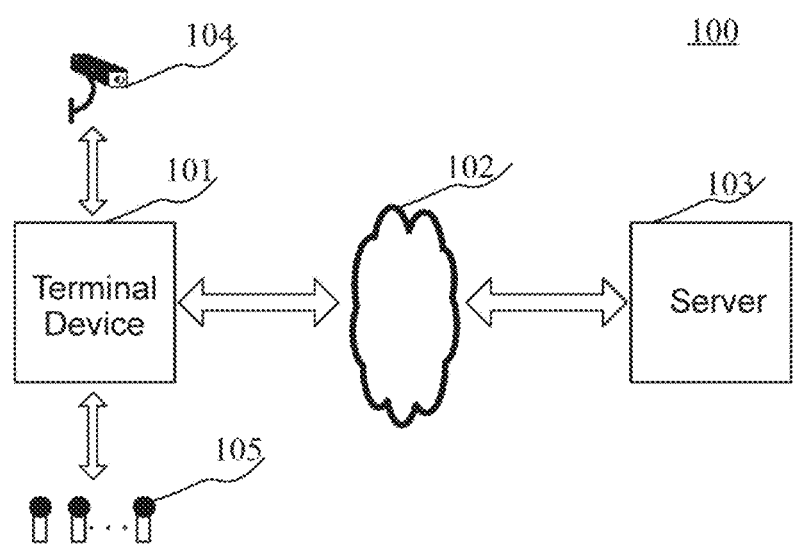
FIG. 1 is a diagram illustrating a system applicable to the present disclosure.

Exemplary embodiments of the present disclosure will be described below in detail with reference to drawings. Apparently, the embodiments described herein are merely one part, rather than all of embodiments in the present application. It should be understood that, the present application is not limited by the exemplary embodiments described herein.

It should be noted that, unless otherwise specified, the scope of the present disclosure is not limited by relative arrangement, numeric expressions and numerical values of components and steps described in these embodiments.

It may be understood by those skilled in the art that, terms such as "first" and "second" in the embodiments of the present disclosure are merely configured for distinguishing different steps, devices or modules, and indicate neither any specific technical meaning, nor necessarily logically ordering among them.

It should be further understood that, in the embodiments of the present disclosure, a term "multiple"/"a plurality of" may refer to two or more; and a term "at least one" may refer to one, two or more.

It should be further understood that any component, data or structure involved in the embodiments of the present disclosure may be generally construed to one or more, unless stated or the context indicates otherwise.

In addition, a term "and/or" in the present disclosure refers to only associated relations that describe associated objects, indicating presence of three relations. For example, A and/or B may indicate presence of three cases: A alone, both A and B, and B alone. In addition, a character "/" in the present disclosure generally indicates an "or" relation of described objects.

It should be further understood that, the descriptions of the various embodiments in the present disclosure focus on differences among the various embodiments. The same or similar parts among the embodiments may refer to one another. For concision, description is not repeated.

Meanwhile, it should be understood that, for convenient descriptions, the drawings are not necessarily to scale in size of any of parts shown therein.

Descriptions of the exemplary embodiment below are merely illustrative, and never serve as any limitation to the present disclosure along with application or use thereof.

Technologies, methods and devices known by those ordinary skilled in the art in the related fields may not be discussed in detail herein. However, where appropriate, the technologies, methods and devices shall be regarded as one part of the description.

It should be noted that, similar signs and letters in the accompanying drawings indicate similar items. Therefore, once a certain item is defined in one of the drawings, the item does not have to be further discussed in the following ones of the drawings.

The embodiments of the present disclosure may be applicable to a terminal device, a computer system, a server and other electronic devices, which may be operated with numerous other general or special computing system environments or configurations. Well-known examples of the terminal device, the computing system and environment or configuration applicable to be used with the terminal device, the computer system, the server and other electronic devices include but are not limited to: a personal computer system, a server computer system, a thin client, a thick client, a handheld or lap device, a microprocessor-based system, a set-top box, programmable consumer electronics, a network PC, a small computer system, a large computer system, a distributed cloud computing technology environment including any of the above systems, and the like.

The terminal device, the computer system, the server and other electronic devices may be described in general context of computer system executable instructions (such as program modules) executed by the computer system. Generally, the program modules may include routines, programs, target programs, components, logics, data structures and the like, for executing specific tasks or realizing specific abstract data types. The computer system/server may be implemented in the distributed cloud computing environment. In the distributed cloud computing environment, the tasks are executed by remote processing device linked through a communication network. In the distributed cloud computing environment, the program modules may be located on a storage medium of a local or remote computing system including the storage device.

Overview of the Present Disclosure

In scenes of speech recognition and control, sometimes it is necessary that speech control performed by specific objects such as children and animals is forbidden, or corresponding control is conducted for the specific objects. For example, in a vehicle-mounted speech application, if there is a child in the car, due to its naughty characteristic, it is often to send a speech command that is not a true intention. For instance, if the child says words such as "open the window" and "turn off the navigation", corresponding prohibition is needed; and if it is needed to play music, personalized recommendation may be provided for the child.

Exemplary System

FIG. 1 shows an exemplary system architecture 100 to which a speech interaction method or a speech interaction apparatus in accordance with an embodiment of the present disclosure is applicable.

As shown in FIG. 1, the system architecture 100 may include a terminal device 101, a network 102, a server 103, camera device 104 and at least one audio acquisition device 105. The network 102 is configured for providing a medium of communications link between the terminal device 101 and the server 103. The network 102 may include various types of connection, such as wired or wireless communications links, optical fiber cables, or the like.

The camera device 104 may shoot objects located in a target space. The at least one audio acquisition device 105 may acquire audio transmitted from the target space.

The terminal device 101 may be used by a user to be interacted with the server 103 via the network 102, so as to receive or transmit messages. Various communication client applications may be installed on the terminal device 101, such as a multimedia application, a search application, a web browser application, a shopping application, an instant messenger and the like.

The terminal device 101 may be various electronic devices, including but not limited to: mobile terminals such as a mobile telephone, a laptop, a digital broadcast receiver, a PDA (personal digital assistant), a PAD (tablet personal computer), a PMP (portable multimedia player) and a vehicle-mounted terminal (such as a vehicle-mounted navigation terminal), and fixed terminals such as a digital TV and a desktop computer. The terminal device 101 may control a speech interaction-targeting device (which may be the terminal device 101 perse, or other devices connected with the terminal device 101) for speech interaction.

The server 103 may be a server that provides various services, such as a background server that recognizes speech, videos and the like uploaded by the terminal device 101. The background server may process the received speech and videos so as to obtain processing results (such as a speech recognition result and a speech control instruction).

It should be noted that, the speech interaction method provided by the embodiments in the present disclosure may be executed by the server 103 or the terminal device 101. Correspondingly, the speech interaction apparatus may be arranged in the server 103 or the terminal device 101.

It should be understood that, numbers of the terminal devices, the networks and the servers shown in FIG. 1 are merely illustrative. According to implementing requirements, there may be any numbers of the terminal devices, the networks and the servers. Under a condition that it is not needed that the videos and the audio are remotely acquired, the above system architecture may not include the network but includes only the terminal device.

Exemplary Method

Figure 2:
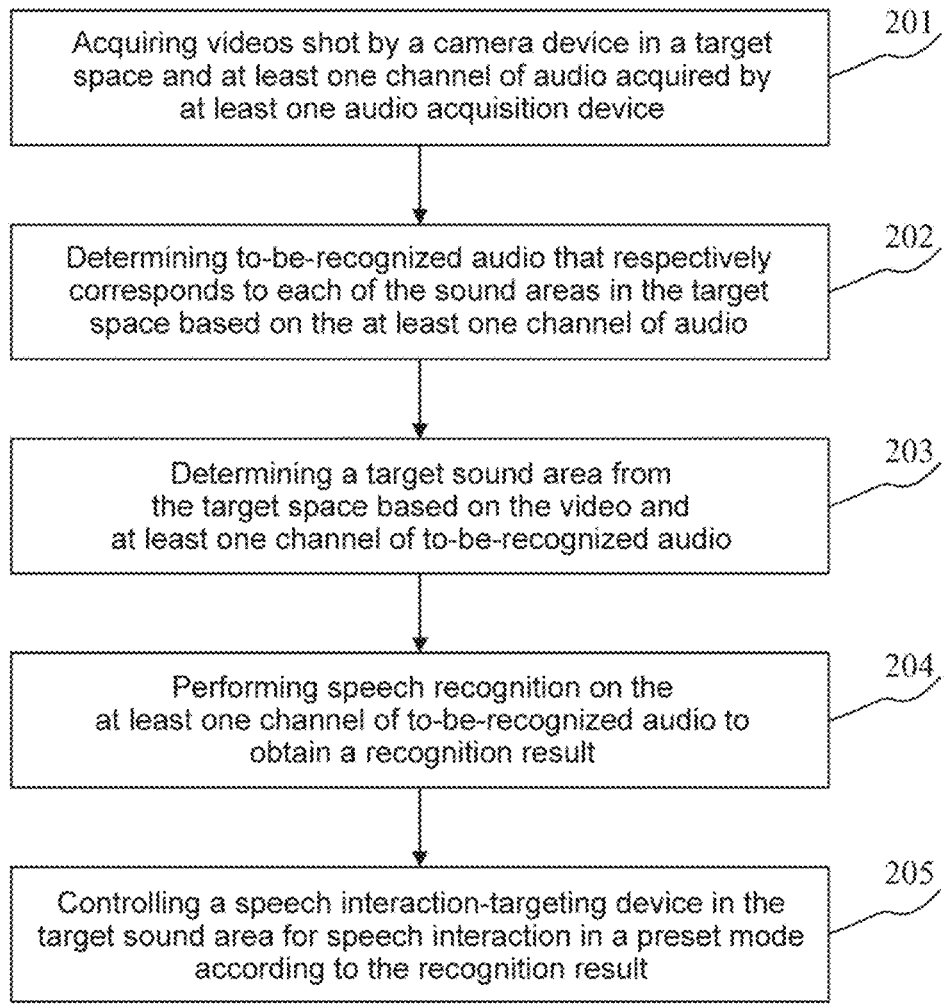
FIG. 2 is a schematic flowchart for a speech interaction method in accordance with an exemplary embodiment of the present disclosure.

FIG. 2 is a schematic flowchart for a speech interaction method in accordance with an exemplary embodiment of the present disclosure. The present embodiment may be applicable to an electronic device (such as the terminal device 101 or the server 103 as shown in FIG. 1). As shown in FIG. 2, the method includes the following steps:

Step 201, videos shot by a camera device in a target space and at least one channel of audio acquired by at least one audio acquisition device are acquired.

In the present embodiment, for the target space, the videos shot by a camera device and at least one channel of audio acquired by at least one audio acquisition device may be acquired by the electronic device. The target space may be all kinds of spaces, such as space in the vehicle or in the room. The camera device is generally arranged in the target space and is configured for shooting the target space. The quantity of the camera device may be one or more. The at least one audio acquisition device is configured for acquiring sound made in the target space to obtain at least one channel of audio, wherein each of the channels of audio corresponds to one audio acquisition device.

Figure 3:
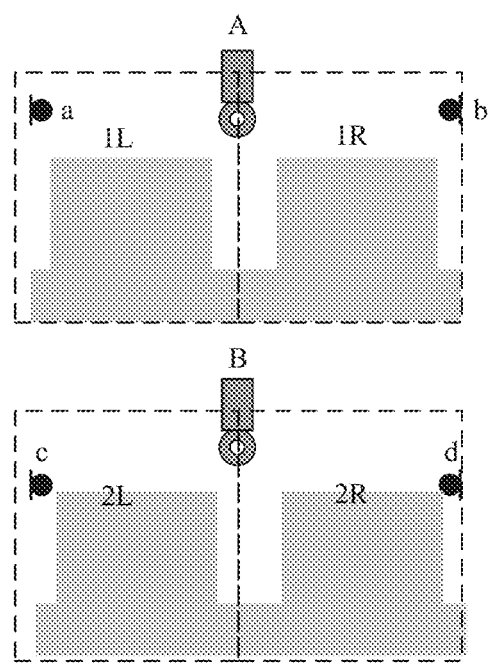
FIG. 3 is a schematic diagram illustrating an application scenario of a speech interaction method in accordance with an embodiment of the present disclosure.

As an example, as shown in FIG. 3, when the target space is an in-vehicle space, a camera A is arranged above the front row in the vehicle; a camera B is arranged above the rear row in the vehicle; and microphones a, b, c and d are arranged beside the four seats, respectively.

Step 202, to-be-recognized audio that respectively corresponds to each of the sound areas in the target space is determined based on the at least one channel of audio.

In the present embodiment, the to-be-recognized audio that respectively corresponds to each of the sound areas in the target space may be determined by the electronic device based on the at least one channel of audio. The sound areas may be multiple areas obtained by dividing the target space artificially. For example, when a target sound area is in the in-vehicle space, the sound areas may be spaces in which the driving seat, the front passenger seat and seats on two sides of rear row are respectively located. Generally, one audio acquisition device may be arranged in a corresponding sound area, and may acquire sound from the corresponding sound area or sound from an adjacent sound area. As shown in FIG. 3, the space in which the four seats are located is respectively divided into the corresponding sound areas, including areas 1L, 1R, 2L and 2R. Audio from the corresponding sound areas is respectively acquired by the microphones a, b, c and d. The to-be-recognized audio that respectively corresponds to each of the sound areas may be audio obtained by processing the at least one channel of audio. For example, the audio acquired by the respective microphones a, b, c and d as shown in FIG. 3 may be de-noised to obtain the corresponding to-be-recognized audio.

It should be noted that, the audio acquisition device and the sound areas may not be in one-to-one correspondence. For example, volume of the audio acquired by the audio acquisition device arranged for the driving seat may be determined. When the volume is greater than a set threshold, it is determined that the acquired audio corresponds to a driving-seat sound area, and the de-noised audio serves as to-be-recognized audio corresponding to the driving-seat sound area; and when the volume is smaller than the set threshold, it is determined that the acquired audio corresponds to a front-passenger-seat sound area, and the de-noised audio serves as to-be-recognized audio corresponding to the front-passenger-seat sound area.

It further should be noted that, in some cases, the to-be-recognized audio corresponding to a certain sound area may be void. For example, when a person located in the sound area 1R in FIG. 3 speaks, since the microphone c is farther away from the sound area 1R, the volume of the sound acquired by the microphone c is smaller. Thus, the to-be-recognized audio corresponding to the sound area 2L may be determined to be void; and it is not needed to perform subsequently speech recognition on the sound area, thereby helping to decrease data processing volume and improve speech recognition efficiency.

Step 203, a target sound area is determined from the target space based on the video and at least one channel of to-be-recognized audio.

In the present embodiment, the target sound area may be determined from the target space by the electronic device based on the video and the at least one channel of to-be-recognized audio. The target sound area may be a sound area where the target object is located; and the target object may be any specific object such as a child, an animal, or a deaf-mute. The electronic device may perform image recognition on the video and recognize the to-be-recognized audio; and recognition results for the video and the to-be-recognized audio are combined for determining the target sound area.

As an example, a target object recognition may be performed on the video by utilizing a preset image recognition model to determine the sound area where the target object is located as the target sound area. Alternatively, the target object recognition is performed on the to-be-recognized audio by utilizing a preset audio recognition model to determine the sound area where the target object is located as the target sound area.

Step 204, the speech recognition is performed on the at least one channel of to-be-recognized audio to obtain the recognition result.

In the present embodiment, speech recognition may be performed on the at least one channel of to-be-recognized audio by the electronic device so as to obtain the recognition result.

A speech recognition method may be a prior speech recognition method. The speech recognition method includes but is not limited to a general recognition, wakeup-free command word recognition and wakeup word recognition, or the like. As an example, the electronic device may input the at least one channel of to-be-recognized audio directly into a pre-trained speech recognition model so as to obtain the recognition result. The recognition result may generally be converted into texts, such as "turn on the air conditioner" and "turn off the navigation".

Step 205, a speech interaction-targeting device in the target sound area is controlled for speech interaction in a preset mode according to the recognition result.

In the present embodiment, the speech interaction-targeting device in the target sound area may be controlled by the electronic device for speech interaction in the preset mode according to the recognition result. The preset mode corresponds to the type of the target object. As an example, when the target object is the child, the preset mode may be a child mode. A child's permission for control of the speech interaction-targeting device may be limited in the child mode. For example, it may be forbidden to perform speech control from the child on windows, the air conditioner and other devices in the vehicle.

According to the method provided in the above embodiments of the present disclosure, for the target space, the shot videos and the acquired at least one channel of audio are obtained; the videos and the audio are recognized jointly so as to determine the target sound area from the target space; a speech recognition is performed on the audio so as to obtain the recognition result; and finally, the speech interaction-targeting device in the target sound area is controlled for speech interaction in the preset mode according to the recognition result.

Therefore, the target object may be detected by the method of integration of the image and speech, and the speech control mode corresponding to the target object is automatically entered according to the detection result, making the speech recognition and corresponding speech control for various more targeted, and helping to avoid misoperation caused by recognized sound of the target object during speech control.

Figure 4A:
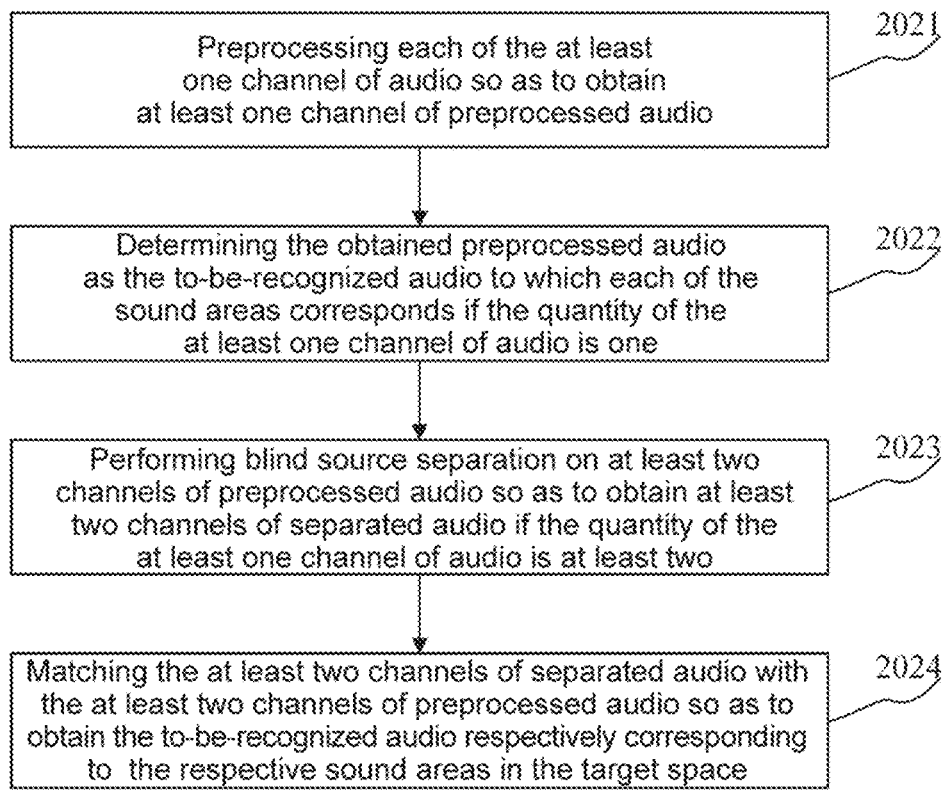
FIG. 4A is a schematic flowchart for a speech interaction method in accordance with another exemplary embodiment of the present disclosure.

In some optional implementation modes, as shown in FIG. 4A, the step 202 may be performed as follows:

Step 2021, each of the at least one channel of audio is preprocessed so as to obtain at least one channel of preprocessed audio.

The preprocessing method may include but is not limited to at least one of band-pass filtering, linear echo cancellation and the like.

Step 2022, if a quantity of the at least one channel of audio is one, the obtained preprocessed audio is determined as the to-be-recognized audio to which each of the sound areas corresponds.

In other words, each sound area corresponds to the same to-be-recognized audio. The target sound area may be determined by subsequent steps in combination with image recognition.

If the quantity of the at least one channel of audio is one, the one channel of audio may be separated into at least two channels of audio, respectively corresponding to speaking speech of different target objects, based on a prior blind source separation technology for audio/video. According to positions of the target objects in the image, the prior technology is used so that different positions in the image correspond to different sound areas, further to determine the sound areas that correspond to the at least two channels of audio.

Step 2023, if the quantity of the at least one channel of audio is at least two, the blind source separation is performed on at least two channels of preprocessed audio so as to obtain at least two channels of separated audio.

The blind source separation refers to a process of restoring various independent components from a source signal in the case that parameters of a source signal and a transmission channel are unknown. The blind source separation may be conducted by prior algorithms, such as Independent Component Analysis (ICA).

Step 2024, the at least two channels of separated audio and the at least two channels of preprocessed audio are matched so as to obtain the to-be-recognized audio to which the respective sound areas in the target space correspond, respectively.

Specifically, signals subjected to blind source separation do not necessarily correspond to the actual sound areas one to one. Therefore, the separated audio needs to be matched with each channel of the preprocessed audio, thereby determining the separated audio respectively corresponding to the respective sound areas as the to-be-recognized audio. As an example, similarity between each channel of separated audio and each channel of preprocessed audio may be determined. For each channel of the preprocessed audio, the separated audio having the maximum similarity to the preprocessed audio is determined as the to-be-recognized audio, thereby determining the to-be-recognized audio to which the respective sound area correspond, respectively.

In the present implementation mode, by performing preprocessing and blind source separation on the audio, the to-be-recognized audio to which the respective sound areas correspond may be accurately obtained, thereby further helping accurate speech recognition on each sound area and enhancing recognition accuracy.

Figure 4B:
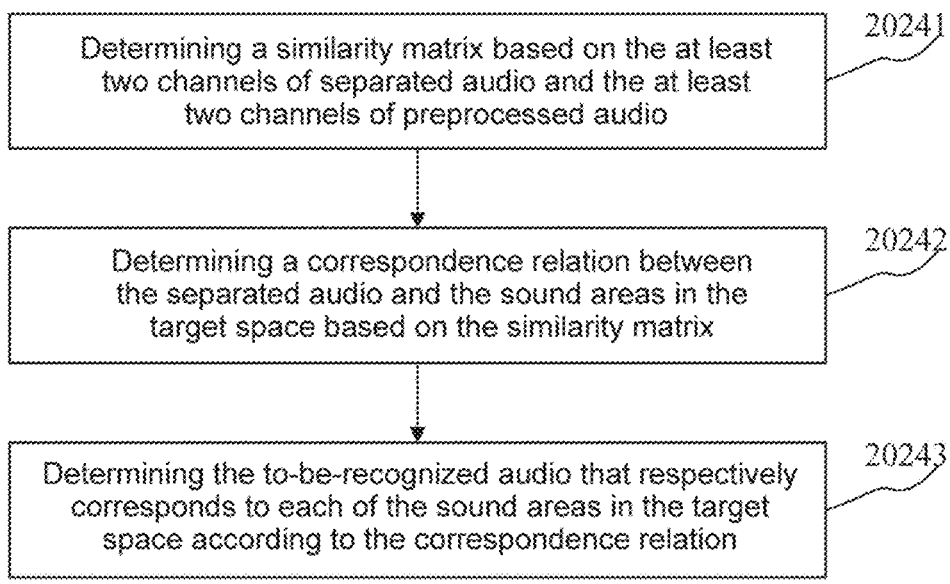
FIG. 4B is a schematic flowchart for a speech interaction method in accordance with another exemplary embodiment of the present disclosure.

In some optional implementation modes, as shown in FIG. 4B, the step 2024 may be performed as follows:

Step 20241, a similarity matrix is determined based on the at least two channels of separated audio and the at least two channels of preprocessed audio.

Elements in the similarity matrix are configured for representing similarity between the separated audio and the preprocessed audio.

Figures 5, 6:
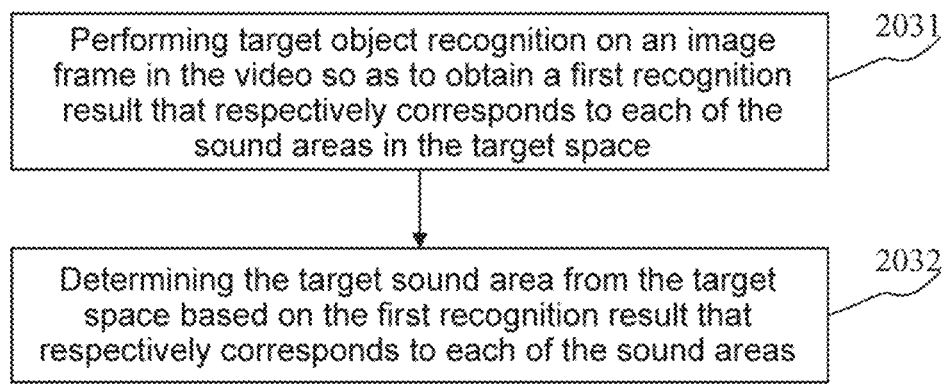
FIG. 5 is an exemplary schematic diagram illustrating a similarity matrix in accordance with an embodiment of the present disclosure.
FIG. 6 is a schematic flowchart for a speech interaction method in accordance with another exemplary embodiment of the present disclosure.

As an example, the similarity matrix is shown as FIG. 5. In the matrix, b(0) to b(3) indicate four channels of preprocessed audio, corresponding to four sound areas; c(0) to c(3)

indicate four channels of separated audio; and the elements in the matrix indicate similarity between every two corresponding channels of audio.

Step 20242, a correspondence relation between the separated audio and the sound areas in the target space is determined based on the similarity matrix.

As an example, the separated audio and the preprocessed audio, to which a maximum value in each line in FIG. 5 corresponds, may be determined to be in correspondence to each other, and thereby the correspondence relation between the separated audio and the sound areas is determined.

Step 20243, the to-be-recognized audio that respectively corresponds to the respective sound areas in the target space is determined according to the correspondence relation.

The separated audio to which the respective sound areas correspond may serve as the to-be-recognized audio herein.

In the implementation mode, the similarity between each channel of separated audio and each channel of preprocessed audio may be determined by determining the similarity matrix, so that the to-be-recognized audio to which the respective sound areas correspond is accurately and efficiently determined, thereby further improving speech recognition accuracy and efficiency.

In some optional implementation modes, the step 20242 may be performed by:

From multiple sound-area-to-audio mapping relations represented by the similarity matrix, a sound-area-to-audio mapping relation with a maximum similarity sum is determined as the correspondence relation between the separated audio and the sound area in the target space. As an example, the similarity matrix may be subjected to optimal solution matching, where possibilities of the respective sound area mappings is traversed; similarities of each of the possibilities are summed; and the sound area mapping with the maximum similarity sum is the optimal solution. As shown in FIG. 5, $S=r(1,0)+r(2,1)+r(0,2)+r(3,3)$, having the maximum value in all sound area mappings, so the correspondence relations are determined as: a sound area 0 corresponds to c(2); a sound area 1 corresponds to c(0); a sound area 2 corresponds to c(1); and a sound area 3 corresponds to c(3).

In the present implementation mode, by determing the maximum value of the similarity sum for matching, the correspondence relation between the separated audio and the sound area may be optimal and is closer to an actual situation, thereby further the to-be-recognized audio to which the respective sound areas correspond being accurately and efficiently determined.

In some optional implementation modes, as shown in FIG. 6, the step 203 may be performed as follows:

Step 2031, target object recognition is performed on an image frame in the video so as to obtain a first recognition result that respectively corresponds to each of the sound areas in the target space.

Specifically, the image frame in the video may be input into a pre-trained target object recognition model to obtain the first recognition result. The first recognition result is configured for representing whether the target object is presented in the corresponding sound area. The above target object recognition model may include but is not limited to such types of models as a convolutional neural network, a recurrent neural network and the like. The model may typically recognize a feature of an object in the image frame such as face, movement and the like, thereby determining whether the object in the image frame is the target object. For example, the target object recognition model may be a child recognition model configured for determining whether a figure in the image frame is a child. Generally, a lower threshold may be set when determining whether the target object is presented in the image frame, so that probability that the target sound area is determined based on the image recognition is improved.

Step 2032, the target sound area is determined from the target space based on the first recognition result that respectively corresponds to each of the sound areas.

As an example, the corresponding first recognition result may indicate that a sound area where the target object is presented serves as the target sound area; and if the first recognition result indicates that the target object is not presented, the recognition of the to-be-recognized audio is performed, determining whether the sound area is the target sound area.

In the present implementation mode, the video is first subjected to target object recognition, and the target sound area is determined from all of sound areas based on the video recognition result, so that an aim of applying the image recognition to determination of the target sound area is achieved, thereby improving accuracy of determination of the target sound area.

Figure 7:
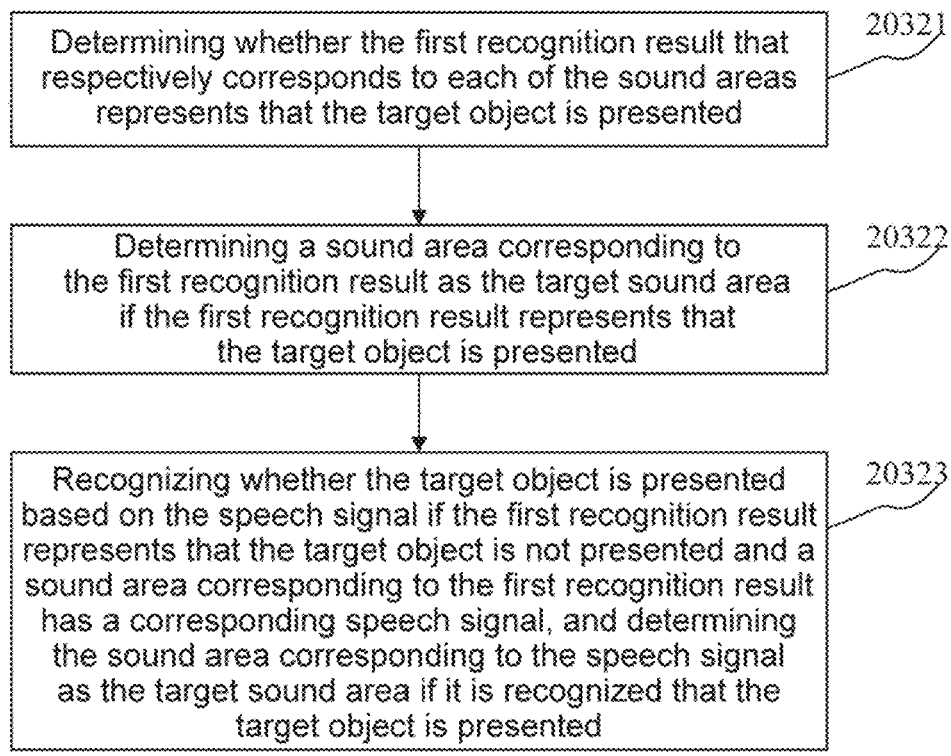
FIG. 7 is a schematic flowchart for a speech interaction method in accordance with another exemplary embodiment of the present disclosure.

In some optional implementation modes, as shown in FIG. 7, the step 2032 may include steps as follows:

Step 20321, it is determined whether the first recognition result that respectively corresponds to each of the sound areas represents that the target object is presented.

Step 20322, if it is represented that the target object is presented, a sound area corresponding to the first recognition result is the target sound area.

Step 20323, if it is represented that the target object is not presented, and a sound area corresponding to the first recognition result has a corresponding speech signal, it is recognized based on the speech signal whether the target object is presented; and if the target object is presented, the sound area corresponding to the speech signal is determined as the target sound area.

Specifically, when the target object has an unclear image, it may be resulted in that the first recognition result represents that the target object is not presented. Then, a speech signal in the to-be-recognized audio corresponding to the sound area may be further extracted; and the recognition is performed on the speech signal so as to determine whether the target object is presented in the sound area. There may be multiple methods for extracting speech signal. For example, the speech signal is extracted from the to-be-recognized audio according to a preset speech frequency range; or mouth recognition may be performed according to the above video, and audio corresponding to a time period of lip movement is determined as the speech signal according to the recognition result.

Generally, the recognition may be performed on the speech signal by utilizing a pre-trained target object speech detection model. The target object speech detection model may be trained in advance by utilizing prior algorithms such as a neural network. The speech signal is input into the target object speech detection model, so that information representing whether the target object is presented may be obtained.

In the present implementation mode, when the first recognition result represents that the target object is not presented, the speech recognition is further performed so as to determine whether the target object is presented. Accordingly, secondary recognition of the target sound area is realized, thereby further enhancing the accuracy of determination of the target sound area.

In some optional implementation modes, in the step 20323, the electronic device may recognize whether the target object is presented according to steps as follows:

Firstly, a signal-noise ratio of the speech signal is determined, wherein the signal-noise ratio is a ratio of a speech signal to a noise signal in an audio signal. As an example, the speech signal and the noise signal may be extracted from the to-be-recognized audio according to a preset speech frequency range and a noise frequency range, and an energy ratio of the speech signal to the noise signal serves as the signal-noise ratio. Alternatively, lip movement recognition may be performed according to the above video, audio corresponding to the time period of lip movement is determined as the speech signal according to lip movement recognition, audio within a time period of non-lip movement is the noise signal, and an energy ratio of the speech signal to the noise signal serves as the signal-noise ratio.

Then, if the signal-noise ratio is more than or equal to a preset signal-noise ratio threshold, the speech signal is determined as a high-quality speech signal.

Finally, the recognition is performed on the high-quality speech signal by utilizing the preset target object speech detection model, so as to obtain information representing whether the high-quality speech signal is sent from the target object. The target object speech detection model in the present implementation mode is configured for detecting whether the input high-quality speech signal is sent from the target object. The target object speech detection model is obtained by training, an initial model such as a neural network, a pre-acquired sample speech signal and corresponding labeled information (i.e., whether the sample voice signal is transmitted from the target object is labeled) by means of a machine learning method.

As an example, the target object speech detection model may be a child speech detection model. The model is configured for recognizing whether an input speech signal is child speech. If so, a sound area corresponding to the speech signal is the target sound area.

In the present implementation mode, by extracting the high-quality speech signal and detecting the high-quality speech signal by utilizing the target object speech detection model, influence of the noise signal on the speech detection may be decreased; and the accuracy of determination of the target sound area is enhanced.

In some optional implementation modes, in the step 20323, the electronic device may recognize whether the target object is presented according to steps as follows:

The recognition is performed on the speech signal by utilizing the pre-trained target object speech detection model, so as to obtain information representing whether the speech signal is sent from the target object. The target object speech detection model in the present implementation mode is configured for detecting of whether the input speech signal is sent from the target object. In the present implementation mode, detection of the high-quality speech signal does not need to be performed, and it may be determined, by directly inputting the speech signal into target object speech detection model, whether the speech signal is sent from the target object, detection efficiency being enhanced.

Figure 8:
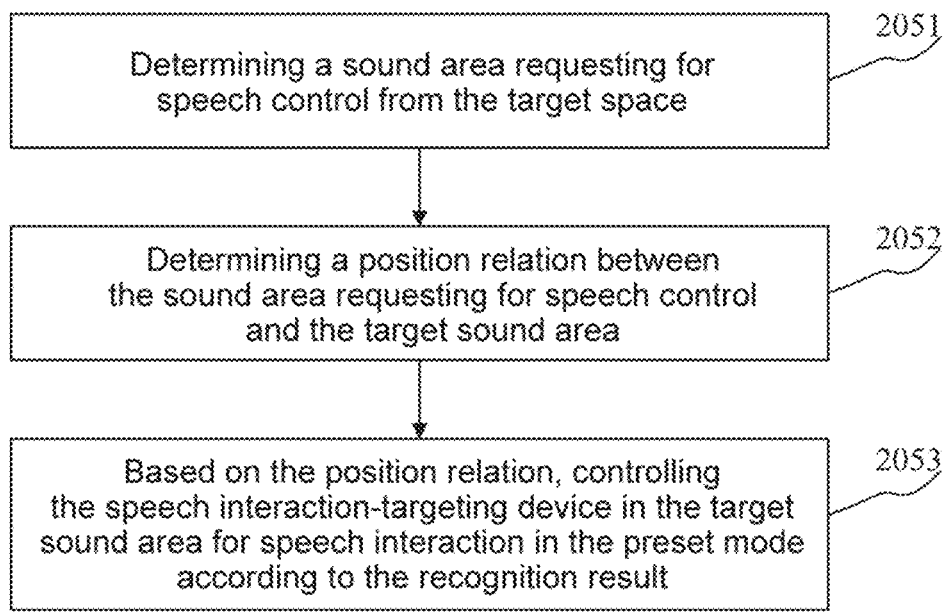
FIG. 8 is a schematic flowchart for a speech interaction method in accordance with another exemplary embodiment of the present disclosure.

In some optional implementation modes, as shown in FIG. 8, the step 205 may include steps as follows:

Step 2051, a sound area requesting for speech control is determined from the target space.

Specifically, a sound area corresponding to a recognition result configured for controlling the speech interaction-targeting device may be determined as the sound area requesting for speech control. For example, if a recognition result corresponding to a certain sound area is "turn on the air conditioner", the sound area is the sound area requesting for speech control.

Step 2052, a position relation between the sound area requesting for speech control and the target sound area is determined.

Step 2053, based on the position relation, the speech interaction-targeting device in the target sound area is controlled for speech interaction in the preset mode according to the recognition result.

Specifically, when the position relation indicates that the target sound area is the sound area requesting for speech control, speech interaction is performed in the preset mode. For example, when the target sound area is a sound area where the child is located and the sound area is the sound area requesting for speech control, the speech interaction-targeting device is set to be in a child mode for speech interaction. When the position relation indicates that the target sound area is not the sound area requesting for speech control, speech interaction is performed in a normal mode. For example, when the target sound area is a sound area where the child is located but the sound area is not the sound area requesting for speech control, speech interaction is performed based on recognition results corresponding to other sound areas requesting for speech control in the normal mode.

In the present implementation mode, according to determination of the sound area requesting for speech control, it is accurately controlled whether the speech interaction-targeting device performs speech interaction in the preset mode, and it is achieved that the speech interaction is performed in different speech control modes for different objects.

Figure 9:
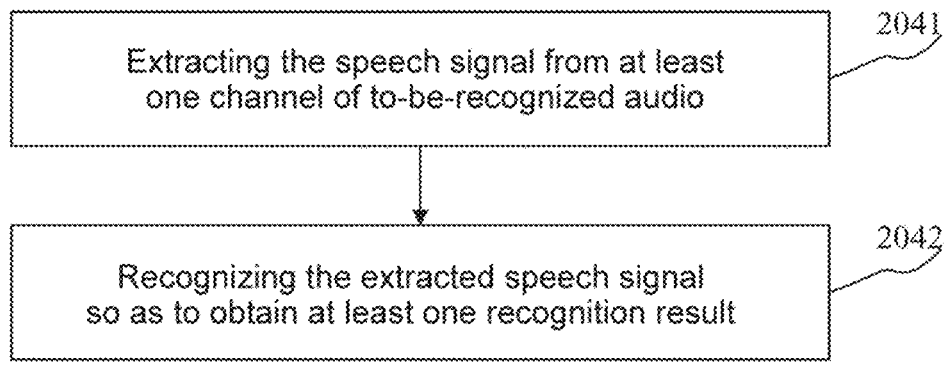
FIG. 9 is a schematic flowchart for a speech interaction method in accordance with another exemplary embodiment of the present disclosure.

In some optional implementation modes, as shown in FIG. 9, the step 204 may include steps as follows:

Step 2041, the speech signal is extracted from at least one channel of to-be-recognized audio.

There may be multiple methods for extracting speech signal. For example, the speech signal is extracted from the to-be-recognized audio according to a preset speech frequency range. Alternatively, speech feature information of the to-be-recognized audio is extracted, and an audio signal segment corresponding to the speech feature information is determined as the speech signal.

Step 2042, the recognition is performed on the extracted speech signal so as to obtain at least one recognition result.

Each of the at least one recognition result respectively corresponds to one sound area. For example, a speech signal A is extracted from audio corresponding to a sound area 1L, and then the speech signal A corresponds to one recognition result.

Based on this, the step 2051 may be performed by:

The sound area requesting for speech control is determined from the target space based on the at least one recognition result. As an example, the sound areas that respectively correspond to each of recognition results may serve as the sound areas requesting for speech control.

In the present implementation mode, the speech signals are extracted from the at least one channel of to-be-recognized audio, and recognition is performed on each of the speech signals so as to obtain the recognition results. Then influences of non-speech signals may be decreased during speech recognition, and speech recognition accuracy is improved.

In some optional implementation modes, the electronic device may determine the sound area requesting for speech control from the target space based on the at least one recognition result according to the following manner:

If the at least one recognition result includes at least two identical recognition results, the sound area requesting for speech control is determined according to the at least two identical recognition results based on magnitude of the energy of the speech signal. Generally, when there are the at least two identical recognition results, it is indicated it is possible the multiple channels of audio are collected from speech spoken by the same object, and it cannot be determined, based on video recognition, which of the sound areas is the one where the object giving speech is located. Then, a sound area corresponding to a speech signal with the maximum energy among the speech signals that respectively correspond to the above at least two identical recognition results may be determined as the sound area requesting for speech control.

In the present implementation mode, the sound area requesting for speech control may be accurately determined according to magnitudes of the energies of the speech signals in case of the multiple identical recognition results, thereby improving the speech recognition and speech control accuracy.

In some optional implementation modes, the step 2041 may be performed by:

Firstly, lip movement recognition is performed on a facial image included in the image frame of the video so as to obtain lip movement information corresponding to a sound area involving a person in the target space.

Specifically, lip key point detection may be performed on the facial image included in the image frame of the video so as to obtain lip key point information of each frame image. If movement between key points of neighbour frames exceeds a preset movement threshold, lip movement is detected. The lip movement information is configured for representing whether a person in a certain sound area is speaking. A lip key point detection method is a prior technology, and details are not described redundantly here.

Then, for each of the sound areas involving a person in the target space, if the lip movement information corresponding to the sound area indicates that the person in the sound area is speaking, the speech signal is extracted from the to-be-recognized audio corresponding to the sound area based on the lip movement information corresponding to the sound area.

Specifically, according to the corresponding lip movement information of each image frame, a time period corresponding to the lip movement image frame may be determined as a speech time period; and then, an audio segment, corresponding to the speech time period, from the to-be-recognized audio is determined as the speech signal.

In the present implementation mode, the lip movement information is obtained by performing lip movement detection on the video, and the speech signal is extracted according to the lip movement information. Accordingly, it is achieved that extraction of the speech signal is performed in combination with the image recognition. Therefore, the extracted speech signal is more accurate.

In some optional implementation modes, the step 204 may include: performing wakeup word recognition on the at least one channel of to-be-recognized audio. The wakeup word recognition method may be realized by a prior technology. For example, the wakeup word recognition is performed by utilizing a wakeup word recognition model pre-trained by a machine learning method.

Based on this, the step 205 may be performed by:

First, determining a number of times at which a wakeup word in audio corresponding to the target sound area is recognized within preset duration.

Then, starting a target object prohibition mode if the number of times is up to a preset frequency, where the target object prohibition mode is configured for prohibiting the target object to perform speech control of a target device by a preset control class. That is, when it is recognized that the target object performs frequently wakeup within the preset duration, the target object prohibition mode is started.

As an example, the target object is a child; the target space is in the vehicle; and if it is recognized that the child performs frequently wakeup within a short time, a child prohibition mode is started. In the child prohibition mode, the child is prohibited to perform speech control on devices such as the windows, the navigation and the seats.

Optionally, in the target object prohibition mode, recommendation information for the target object may be output onto the terminal device as shown in FIG. 1 with respect to the target object. The recommendation information may include music, videos and other contents recommended for children.

In the present implementation mode, real intention of performing speech control by the target object may be accurately determined by means of determination of the number of times of the wakeup word recognition, thereby permission for the speech control may be restricted targetedly for different objects.

In some optional implementation modes, the step 204 may include a step as follows:

The recognition of at least one channel of to-be-recognized audio is performed by utilizing the pre-trained wakeup word recognition model. The wakeup word recognition model is obtained through pre-training based on wakeup words spoken by the target object that are labeled as negative samples. The wakeup word recognition model may recognize wakeup words included in the input to-be-recognized audio, and may further recognize whether the wakeup words are from the target object.

As an example, when the target object is the child, an acquired speech signal with wakeup words spoken by the child is labeled as a negative sample; an acquired speech signal with wakeup words spoken by an adult is labeled as a positive sample; and training is performed by utilizing the machine learning method so as to obtain the wakeup word recognition model.

Based on this, the step 205 may include a step as follows:

The target object prohibition mode is started in response to the determination that the recognition result output by the wakeup word recognition model includes the wakeup words and the representing that the wakeup words are from the target object.

In the present implementation mode, through recognizing of the wakeup words by using the wakeup word recognition model and determining whether the wakeup words are from the target object, it may be rapidly and accurately determined whether the target object prohibition mode is started, and speech control pertinence is improved.

Exemplary Apparatus

Figure 10:
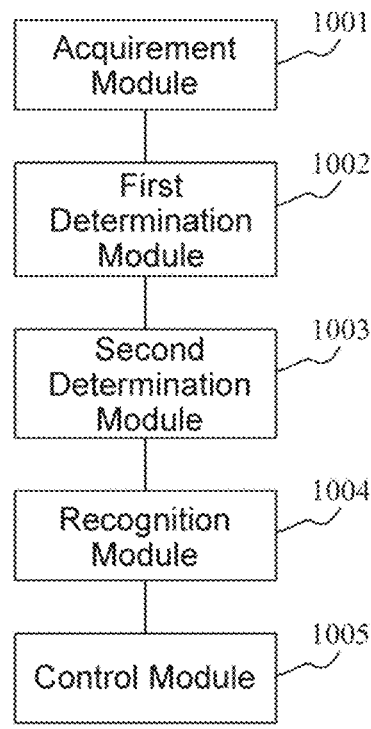
FIG. 10 is a structural schematic block diagram illustrating a speech interaction apparatus in accordance with one exemplary embodiment of the present disclosure.

FIG. 10 is a structural schematic block diagram illustrating a speech interaction apparatus in accordance with one exemplary embodiment of the present disclosure. The present embodiment may be applicable to an electronic device. As shown in FIG. 10, the speech interaction apparatus includes: an acquirement module 1001, configured for acquiring videos shot by a camera device in a target space and at least one channel of audio acquired by at least one audio acquisition device; a first determination module 1002, configured for determining the to-be-recognized audio that respectively corresponds to each of the sound areas in the target space based on the at least one channel of audio; a second determination module 1003, configured for determining a target sound area from the target space based on the video and at least one channel of to-be-recognized audio; a recognition module 1004, configured for performing speech recognition on the at least one channel of to-be-recognized audio to obtain a recognition result; and a control module 1005, configured for controlling a speech interaction-targeting device in the target sound area for speech interaction in a preset mode according to the recognition result.

In the present embodiment, the acquirement module 1001 may acquire the videos shot by the camera device in the target space and the at least one channel of audio acquired by the at least one audio acquisition device. The target space may be each kind of space, such as in the vehicle and in the room. The camera device is generally arranged in the target space and is configured for shooting the target space. The quantity of the camera device may be one or more. The at least one audio acquisition device is configured for acquiring sound made in the target space to obtain at least one channel of audio, wherein each channel of audio corresponds to one audio acquisition device.

In the present embodiment, the to-be-recognized audio that respectively corresponds to each of the sound areas in the target space may be determined by the first determination module 1002 based on the at least one channel of audio. The sound areas may be multiple areas obtained by dividing the target space artificially. For example, when a target sound area is the in-vehicle space, the sound areas may be spaces in which the driving seat, the front passenger seat and seats on two sides of rear row are respectively located. Generally, one audio acquisition device may be arranged in a corresponding sound area, and may acquire sound from the sound area or sound from an adjacent sound area. As shown in FIG. 3, the space in which the four seats are located is respectively divided into the corresponding sound areas, including areas 1L, 1R, 2L and 2R. Audio from the corresponding sound areas is respectively acquired by the microphones a, b, c and d. The to-be-recognized audio that respectively corresponds to each of the sound areas may be audio obtained by processing the at least one channel of audio. For example, the audio acquired by the respective microphones a, b, c and d as shown in FIG. 3 may be de-noised to obtain the corresponding to-be-recognized audio.

It should be noted that, the audio acquisition device and the sound areas may not be in one-to-one correspondence. For example, volume of the audio acquired by the audio acquisition device arranged for the driving seat may be determined. When the volume is greater than a set threshold, it is determined that the acquired audio corresponds to a driving-seat sound area, and the de-noised audio serves as to-be-recognized audio corresponding to the driving-seat sound area; and when the volume is smaller than the set threshold, it is determined that the acquired audio corresponds to a front-passenger-seat sound area, and the de-noised audio serves as to-be-recognized audio corresponding to the front-passenger-seat sound area.

It further should be noted that, in some cases, the to-be-recognized audio corresponding to a certain sound area may be void. For example, when a person located in the sound area 1R in FIG. 3 speaks, since the microphone c is farther away from the 1R, the volume of the acquired sound is smaller. Thus, the to-be-recognized audio corresponding to the sound area 2L may be determined to be void.

In the present embodiment, the second determination module 1003 may determine the target sound area from the target space based on the video and the at least one channel of to-be-recognized audio. The target sound area may be a sound area where the target object is located; and the target object may be any specific object such as a child, an animal, or a deaf-mute. The electronic device may perform image recognition on the video and recognize the to-be-recognized audio; and recognition results for the video and the to-be-recognized audio are combined for determining the target sound area.

As an example, a target object recognition may be performed on the video by utilizing a preset image recognition model to determine the sound area where the target object is located as the target sound area. Alternatively, the target object recognition is performed on to-be-recognized audio by utilizing a preset audio recognition model ti deternube the sound area where the target object is located as the target sound area.

In the present embodiment, speech recognition may be performed on the at least one channel of to-be-recognized audio by the recognition module 1004 so as to obtain the recognition result.

A speech recognition method may be a prior speech recognition method. The speech recognition method includes but is not limited to a general recognition, wakeup-free command word recognition and wakeup word recognition, or the like. As an example, the electronic device may input the at least one channel of to-be-recognized audio directly into a pre-trained speech recognition model so as to obtain the recognition result. The recognition result may generally be converted into texts, such as "turn on the air conditioner" and "turn off the navigation".

In the present embodiment, the speech interaction-targeting device in the target sound area may be controlled by the control module 1005 for speech interaction in the preset mode according to the recognition result. The preset mode corresponds to the type of the target object. As an example, when the target object is the child, the preset mode may be a child mode. A child's permission for control of the speech interaction-targeting device may be limited in the child mode. For example, it may be forbidden to perform speech control from the child on windows, the air conditioner and other devices in the vehicle.

Figure 11:
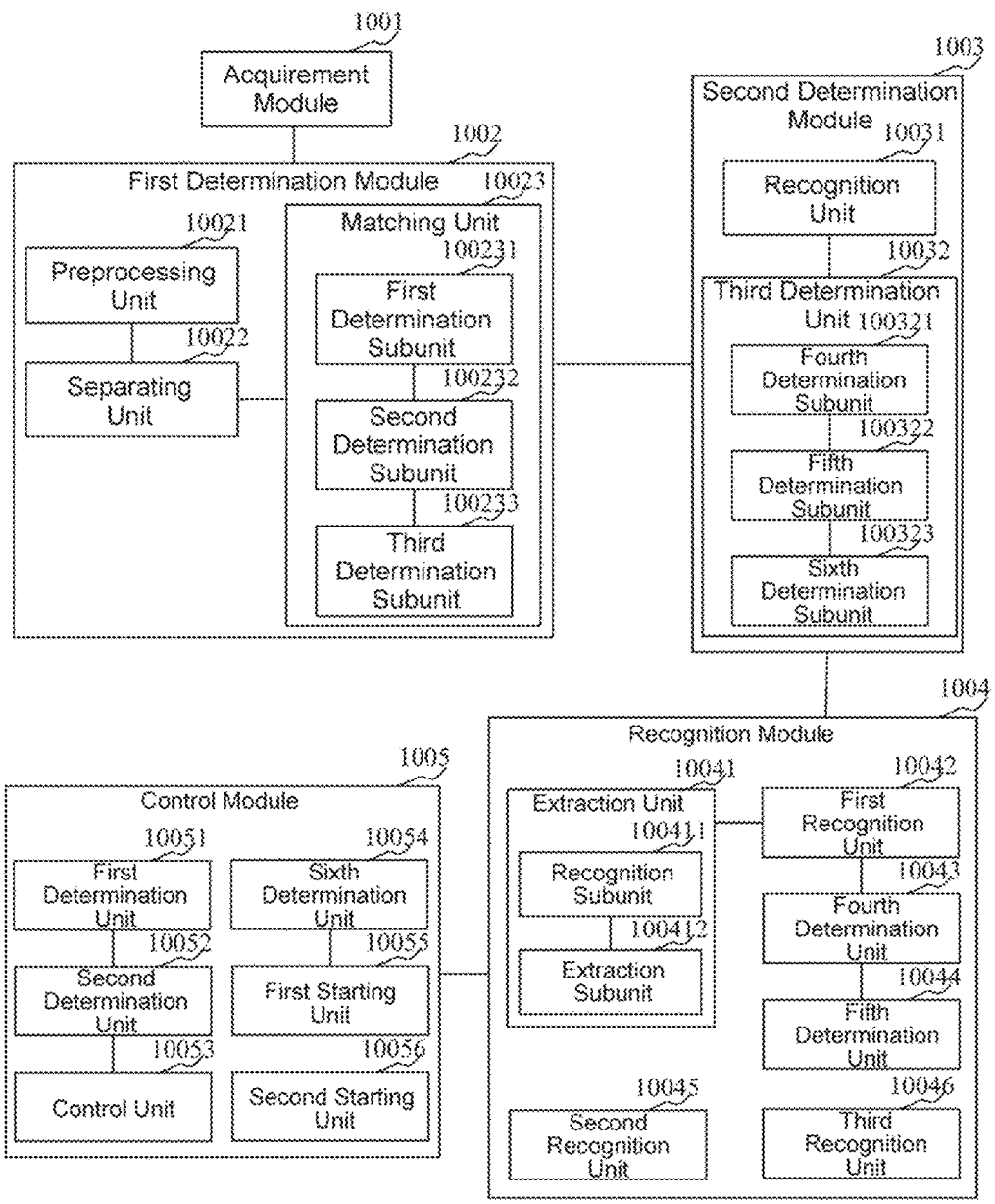
FIG. 11 is a structural schematic block diagram illustrating a speech interaction apparatus in accordance with another exemplary embodiment of the present disclosure.

Referring to FIG. 11, FIG. 11 is a structural schematic block diagram illustrating a speech interaction apparatus in accordance with another exemplary embodiment of the present disclosure.

In some optional implementation modes, the control module 1005 may include: a first determination unit 10051, configured for determining a sound area requesting for speech control from the target space; a second determination unit 10052, configured for determining a position relation between the sound area requesting for speech control and the target sound area; and a control unit 10053, configured for controlling the speech interaction-targeting device in the target sound area for speech interaction in the preset mode according to the recognition result based on the position relation.

In some optional implementation modes, the first determination module 1002 may include: a preprocessing unit 10021, configured for preprocessing each of the at least one channel of audio so as to obtain at least one channel of preprocessed audio; a separation unit 10022, configured for determining the obtained preprocessed audio as the to-berecognized audio to which the respective sound areas correspond if a quantity of the at least one channel of audio is one, and for performing blind source separation on the at least two channels of preprocessed audio so as to obtain at least two channels of separated audio if the quantity of the at least one channel of audio is at least two; and a matching unit 10023, configured for matching the at least two channels of separated audio with the at least two channels of preprocessed audio so as to obtain the to-be-recognized audio to which the respective sound areas in the target space correspond.

In some optional implementation modes, the matching unit 10023 may include: a first determination subunit 100231, configured for determining a similarity matrix based on the at least two channels of separated audio and the at least two channels of preprocessed audio, wherein elements in the similarity matrix are configured for representing similarity between the separated audio and the preprocessed audio; a second determination subunit 100232, configured for determining a correspondence relation between the separated audio and the sound areas in the target space based on the similarity matrix; and a third determination subunit 100233, configured for determining the to-be-recognized audio that respectively corresponds to each of the sound areas in the target space according to the correspondence relation.

In some optional implementation modes, the second determination subunit 100232 may be further configured for: determining, from multiple sound-area-to-audio mapping relations represented by the similarity matrix, a sound-area-to-audio mapping relation with a maximum similarity sum as the correspondence relation between the separated audio and the sound area in the target space.

In some optional implementation modes, the second determination module 1003 may include: a recognition unit 10031, configured for performing target object recognition on an image frame in the video so as to obtain a first recognition result that respectively corresponds to each of the sound areas in the target space; and a third determination unit 10032, configured for determining the target sound area from the target space based on the first recognition result that respectively corresponds to each of the sound areas.

In some optional implementation modes, the third determination unit 10032 may include: a fourth determination subunit 100321, configured for determining whether the first recognition result that respectively corresponds to each of the sound areas represents that the target object is presented; a fifth determination subunit 100322, configured for determining that the sound area corresponding to the first recognition result is the target sound area if the first recognition result represents that the target object is presented; and a sixth determination subunit 100323, configured for recognizing whether the target object is presented based on the speech signal if the first recognition result represents that the target object is not presented and the sound area corresponding to the first recognition result has a corresponding speech signal, and configured for determining the sound area corresponding to the speech signal as the target sound area if it is recognized that the target object is presented.

In some optional implementation modes, the sixth determination subunit 100323 may be further configured for: determining a signal-noise ratio of the speech signal; determining the speech signal as a high-quality speech signal if the signal-noise ratio is more than or equal to a preset signal-noise ratio threshold; and recognizing the high-quality speech signal by utilizing the preset target object speech detection model, so as to obtain information representing whether the high-quality speech signal is sent from the target object.

In some optional implementation modes, the sixth determination subunit 100323 may be further configured for: recognizing the speech signal by utilizing a pre-trained target object speech detection model, so as to obtain information representing whether the high-quality speech signal is sent from the target object.

In some optional implementation modes, the recognition module 1004 may include: an extraction unit 10041, configured for extracting the speech signal from at least one channel of to-be-recognized audio; a first recognition unit 10042, configured for recognizing the extracted speech signal so as to obtain at least one recognition result, wherein each of the at least one recognition result respectively corresponds to one sound area; a fourth determination unit 10043, configured for determining the sound area, requesting for speech control, from the target space; and a fifth determination unit 10044, configured for determining the sound area, requesting for speech control, from the target space based on the at least one recognition result.

In some optional implementation modes, the fifth determination unit 10044 may be further configured for: determining the sound area requesting for speech control according to at least two identical recognition results based on magnitude of energy of the speech signal, if the at least one recognition result includes the at least two identical recognition results.

In some optional implementation modes, the extraction unit 10041 may include: a recognition subunit 100411, configured for performing lip movement recognition on a facial image included in an image frame of the video so as to obtain lip movement information corresponding to a sound area involving a person in the target space; and an extraction subunit 100412, configured for, for each of sound areas in the target space, extracting the speech signal from the to-be-recognized audio corresponding to the sound area based on the lip movement information corresponding to the sound area, if the lip movement information corresponding to the sound area indicates that the person in the sound area is speaking.

In some optional implementation modes, the recognition module 1004 may include: a second recognition unit 10045, configured for performing wakeup word recognition on the at least one channel of to-be-recognized audio. Moreover, the control module 1005 includes: a sixth determination unit 10054, configured for determining a number of times at which a wakeup word in audio corresponding to the target sound area is recognized within preset duration; and a first starting unit 10055, configured for starting a target object prohibition mode if the number of times is up to a preset frequency, wherein the target object prohibition mode is configured for prohibiting the target object to perform speech control of a target device by a preset control class.

In some optional implementation modes, the recognition module 1004 may include: a third recognition unit 10046, configured for recognizing the at least one channel of to-be-recognized audio by utilizing the pre-trained wakeup word recognition model, wherein the wakeup word recognition model is obtained through pre-training based on wakeup words spoken by the target object that are labeled as negative samples. Moreover, the control module 1005 may include: a second starting unit 10056, configured for starting the target object prohibition mode in response to the determination that the recognition result output by the wakeup word recognition model includes the wakeup words and the representing that the wakeup words are from the child.

Based on the speech interaction apparatus provided in the embodiments of the present disclosure, for the target space, the spot videos and the acquired audio are obtained; the videos and the audio are recognized jointly so as to determine the target sound area; then a speech recognition is performed on the audio so as to obtain the recognition result; and finally, the speech interaction-targeting device in the target sound area is controlled for speech interaction in the preset mode according to the recognition result. Thus, the speech interaction apparatus in the embodiments of the present disclosure may detect a target object by the method of integration of an image and speech, a speech control mode corresponding to the target object is automatically entered according to a detection result, making objects on the speech recognition and corresponding speech control for various types more targeted, and helping to avoid misoperation caused by recognized sound of the target object during speech control.

Exemplary Electronic Device

The electronic device in the embodiments of the present disclosure will be described below by referring to FIG. 12. The electronic device may be any one or two among the terminal device 101 and the server 103 as shown in FIG. 1, or a stand-alone device separated from them. The stand-alone device may communicate with the terminal device 101 and the server 103, so as to receive acquired input signals from the terminal device 101 and the server 103.

Figure 12:
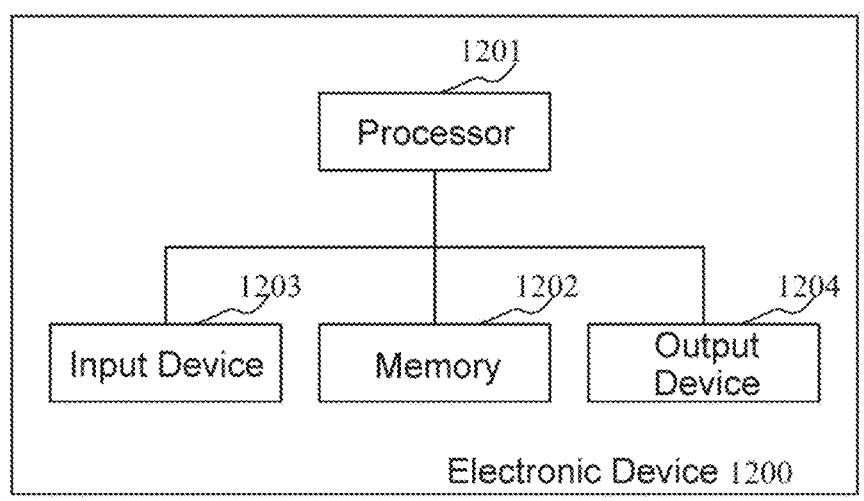
FIG. 12 is a structural block diagram of an electronic device in accordance with one exemplary embodiment of the present disclosure.

FIG. 12 is a block diagram illustrating the electronic device according to the embodiments of the present disclosure.

As shown in FIG. 12, the electronic device 1200 includes one or more processors 1201 and a memory 1202.

The processor 1201 may be a central processing unit (CPU) or other form of processing units with data processing capacity and/or instruction execution capacity, and may control other components in the electronic device 1200 to execute desired functions.

The memory 1202 may include one or more computer program products. The computer program products may include various forms of computer readable storage media, such as a volatile memory and/or a nonvolatile memory. For example, the volatile memory may include a random access memory (RAM) and/or a cache. The nonvolatile memory may include a read-only memory (ROM), a hard disk or a flash memory. One or more computer program instructions may be stored on the computer readable storage media. The program instructions may be executed by the processor 1201, so as to perform the above speech interaction method in each embodiment of the present disclosure and/or other desired functions. Various contents such as videos and audio may further be stored in the computer readable storage media.

In one example, the electronic device 1200 may further include: an input device 1203 and an output device 1204. These components are connected with each other through a bus system and/or a connecting mechanism (not shown) of any other form.

For example, when the electronic device is the terminal device 101 or the server 103, the input device 1203 may be a microphone, a camera or any other device, and is configured for inputting the audio and videos. When the electronic device is the stand-alone device, the input device 1203 may be a communication network connector, and is configured for receiving the input audio and videos from the terminal device 101 and the server 103.

The output device 1204 may output various kinds of information outside, including speech recognition results. The output device 1204 may include a display, a loudspeaker, a communication network, and a remote output device connected by the communication network.

Certainly, for simplicity, FIG. 12 shows only some components of the electronic device 1200 related to the present disclosure; and components such as buses and an input/output interface are omitted. Moreover, according to specific application situations, the electronic device 1200 may further include any other appropriate component.

Exemplary Computer Program Products and Computer Readable Storage Media

In addition to the above method and device, the embodiments of the present disclosure may further relate to computer program products. The computer program products include computer program instructions. When the computer program instructions are executed by the processor to cause the processor to perform the steps in the speech interaction method according to the various embodiments of the present disclosure described in the above "exemplary method" part of the description.

The computer program products may be program codes, written with one or any combination of multiple programming languages, that are configured for performing the operations in the embodiments of the present disclosure. The programming languages include object-oriented programming languages such as Java and C++, and further include conventional procedural programming languages such as a "C" language or a similar programming language. The program codes may be completely or partially executed on a user computing device, executed serving as an independent software package, partially executed on the user computing device and partially executed on a remote computing device, or completely executed on the remote computing device or the server.

In addition, the embodiments of the present disclosure may further be the computer readable storage media, where computer program instructions are stored. When the computer program instructions are executed by the processor, the processor is caused to perform the steps in the speech interaction method according to the various embodiments of the present disclosure described in the above "exemplary method" part of the description.

The computer readable storage medium may be one readable medium or any combination of multiple readable media. The readable medium may be a readable signal medium or a readable storage medium. For example, the readable storage medium may include but is not limited to electricity, magnetism, light, electromagnetism, infrared ray, or a semiconductor system, apparatus or device, or any combination of the above. A more specific example (a non-exhaustive list) of the readable storage medium includes: an electric connector with one or more wires, a portable disk, a hard disk, a random access memory (RAM), a read-only memory (ROM), an electrically programmable read-only-memory (EPROM) or a flash memory, an optical fiber, a compact disc read-only memory (CD-ROM), a optical storage device, a magnetic storage device, or any appropriate combination of the above devices.

Basic principles of the present disclosure are described above in combination with specific embodiments. However, it should be pointed out that, advantages and effects mentioned in the present disclosure are merely illustrative, rather than a limitation. It cannot be thought that these advantages and effects are necessary in the various embodiments of the present disclosure. In addition, specific details of the above disclosure are merely for illustration and understanding convenience, rather than a limitation. The above details do not limit that the present disclosure must be realized by using the above specific details.

The various embodiments in the description are all described in a progressive way, and. each embodiment focuses on a difference from other embodiments. Identical or similar parts among the various embodiments may refer to one another. Since a system in the embodiments basically corresponds to the method in the embodiments, the system is relatively simply described. Related parts shall refer to partial descriptions of the method in the embodiments.

Block diagrams of the components, apparatuses, device and systems involved in the present disclosure merely serve as exemplary samples, and are not intended to require or imply that the components, apparatus, device and systems must be connected, arranged and configured according to ways illustrated in the block diagrams. It is recognized by those skilled in the art that, these components, apparatuses, device and systems may be connected, arranged and configured according to an arbitrary manner. For example, words such as "include", "comprise", "have" and the like are open words, refer to "include but not limited to", and may be interchanged with each other for use. Terms such as "or" and "and" used herein refer to a term "and/or", and may be interchanged with each other for use, unless expressly stated that the term is not so in the context. A term "such as" used herein refers to a term "such as but not limited to", and may be interchanged with each other for use.

The method and apparatus in the present disclosure may be realized in many manners. For example, the method and apparatus in the present disclosure may be realized by software, hardware, firmware, or any combination of the software, hardware and firmware. The above sequence for the steps of the above method is merely for description. The steps of the method in the present disclosure are not limited to the above specifically described sequence, unless otherwise specified in any other manner. In addition, in some embodiments, the present disclosure may be implemented as programs recorded in a recording medium. These programs include machine readable instructions configured for realizing the method according to the present disclosure. Therefore, the present disclosure further covers the recording medium stored with programs that are configured for implementing the method according to the present disclosure.

It should be further pointed out that, the various components or the various steps in the apparatus, the device and the method of the present disclosure may be disassembled and/or recombined. These disassembled and/or recombined components or steps shall be regarded as equivalent solutions of the present disclosure.

The above descriptions of the disclosed aspects are provided so that the present disclosure may be complete or carried out by those skilled in the art. Various modifications to these aspects are very obvious to those skilled in the art. Moreover, general principles defined herein may be applicable to other aspects without departing from the scope of the present disclosure. Therefore, the present disclosure is not intended to be limited to the aspects illustrated herein, but be the widest scope in accordance with the principles and novel features disclosed herein.

The above descriptions have been given for illustration and description. In addition, these descriptions are not intended to limit the embodiments of the present disclosure to be in forms in the present disclosure. Although multiple exemplary aspects and embodiments have been discussed above, it would be appreciated by those skilled in the art that their variants, modifications, changes, additions and sub-combinations may be made without departing from the scope of the present disclosure.

The invention claimed is:

1. A speech interaction method, including:
    acquiring videos shot by a camera device in a target space and at least one channel of audio acquired by at least one audio acquisition device;
    determining to-be-recognized audio that respectively corresponds to each of sound areas in the target space based on the at least one channel of audio;
    determining a target sound area from the target space based on the video and at least one channel of to-be-recognized audio;
    performing speech recognition on the at least one channel of to-be-recognized audio to obtain a recognition result; and
    controlling a speech interaction-targeting device in the target sound area for speech interaction in a preset mode according to the recognition result,
    wherein the determining to-be-recognized audio that respectively corresponds to each of the sound areas in the target space based on the at least one channel of audio includes:
    preprocessing each of the at least one channel of audio so as to obtain at least one channel of preprocessed audio;
    if a quantity of the at least one channel of audio is one, determining the obtained preprocessed audio as the to-be-recognized audio to which each of the sound areas correspond;
    if the quantity of the at least one channel of audio is at least two, performing blind source separation on at least two channels of preprocessed audio so as to obtain at least two channels of separated audio; and
    matching the at least two channels of separated audio with the at least two channels of preprocessed audio so as to obtain the to-be-recognized audio to which the respective sound areas in the target space correspond.

2. The method according to claim 1, wherein the controlling the speech interaction-targeting device in the target sound area for speech interaction in the preset mode according to the recognition result includes:
    determining a sound area requesting for speech control from the target space;
    determining a position relation between the sound area requesting for speech control and the target sound area; and
    controlling the speech interaction-targeting device in the target sound area for speech interaction in the preset mode according to the recognition result based on the position relation.

3. The method according to claim 1, wherein the matching the at least two channels of separated audio with the at least two channels of preprocessed audio so as to obtain the to-be-recognized audio to which the respective sound areas in the target space correspond includes:
    determining a similarity matrix based on the at least two channels of separated audio and the at least two channels of preprocessed audio, wherein elements in the similarity matrix are configured for representing similarity between the separated audio and the preprocessed audio;
    determining a correspondence relation between the separated audio and the sound area in the target space based on the similarity matrix; and determining the to-be-recognized audio that respectively corresponds to each of the sound areas in the target space according to the correspondence relation.

4. The method according to claim 1, wherein the determining the target sound area from the target space based on the video and at least one channel of to-be-recognized audio includes:
performing target object recognition on an image frame in the video so as to obtain a first recognition result that respectively corresponds to each of the sound areas in the target space; and
determining the target sound area from the target space based on the first recognition result that respectively corresponds to each of the sound areas.

5. The method according to claim 4, wherein the determining the target sound area from the target space based on the first recognition result that respectively corresponds to each of the sound areas includes:
determining whether the first recognition result that respectively corresponds to each of the sound areas represents that the target object is presented;
determining that the sound area corresponding to the first recognition result as the target sound area if the first recognition result represents that the target object is presented; and
recognizing whether the target object is presented based on the speech signal if the first recognition result represents that the target object is not presented and the sound area corresponding to the first recognition result has a corresponding speech signal, and determining the sound area corresponding to the speech signal as the target sound area if that the target object is recognized to be presented.

6. The method according to claim 1, wherein the performing the speech recognition on the at least one channel of to-be-recognized audio includes
performing wakeup word recognition on the at least one channel of to-be-recognized audio;
the controlling a speech interaction-targeting device in the target sound area for speech interaction in the preset mode according to the recognition result includes:
determining a number of times at which a wakeup word in audio corresponding to the target sound area is recognized within preset duration; and
starting a target object prohibition mode if the number of times is up to a preset frequency, wherein the target object prohibition mode is configured for prohibiting the target object to perform speech control of a target device by a preset control class.

7. A computer readable storage medium, which stores computer programs configured for, when being executed, performing a speech interaction method including:
acquiring videos shot by a camera device in a target space and at least one channel of audio acquired by at least one audio acquisition device;
determining to-be-recognized audio that respectively corresponds to each of sound areas in the target space based on the at least one channel of audio;
determining a target sound area from the target space based on the video and at least one channel of to-be-recognized audio;
performing speech recognition on the at least one channel of to-be-recognized audio to obtain a recognition result; and
controlling a speech interaction-targeting device in the target sound area for speech interaction in a preset mode according to the recognition result,
wherein the determining to-be-recognized audio that respectively corresponds to each of the sound areas in the target space based on the at least one channel of audio includes:
preprocessing each of the at least one channel of audio so as to obtain at least one channel of preprocessed audio;
if a quantity of the at least one channel of audio is one, determining the obtained preprocessed audio as the to-be-recognized audio to which each of the sound areas correspond;
if the quantity of the at least one channel of audio is at least two, performing blind source separation on at least two channels of preprocessed audio so as to obtain at least two channels of separated audio; and
matching the at least two channels of separated audio with the at least two channels of preprocessed audio so as to obtain the to-be-recognized audio to which the respective sound areas in the target space correspond.

8. The computer readable storage medium according to claim 7, wherein the controlling the speech interaction-targeting device in the target sound area for speech interaction in the preset mode according to the recognition result includes:
determining a sound area requesting for speech control from the target space;
determining a position relation between the sound area requesting for speech control and the target sound area; and
controlling the speech interaction-targeting device in the target sound area for speech interaction in the preset mode according to the recognition result based on the position relation.

9. The computer readable storage medium according to claim 7, wherein the matching the at least two channels of separated audio with the at least two channels of preprocessed audio so as to obtain the to-be-recognized audio to which the respective sound areas in the target space correspond includes:
determining a similarity matrix based on the at least two channels of separated audio and the at least two channels of preprocessed audio, wherein elements in the similarity matrix are configured for representing similarity between the separated audio and the preprocessed audio;
determining a correspondence relation between the separated audio and the sound area in the target space based on the similarity matrix; and
determining the to-be-recognized audio that respectively corresponds to each of the sound areas in the target space according to the correspondence relation.

10. The computer readable storage medium according to claim 7, wherein the determining the target sound area from the target space based on the video and at least one channel of to-be-recognized audio includes:
performing target object recognition on an image frame in the video so as to obtain a first recognition result that respectively corresponds to each of the sound areas in the target space; and
determining the target sound area from the target space based on the first recognition result that respectively corresponds to each of the sound areas.

11. The computer readable storage medium according to claim 10, wherein the determining the target sound area from the target space based on the first recognition result that respectively corresponds to each of the sound areas includes:

determining whether the first recognition result that respectively corresponds to each of the sound areas represents that the target object is presented;

determining that the sound area corresponding to the first recognition result as the target sound area if the first recognition result represents that the target object is presented; and recognizing whether the target object is presented based on the speech signal if the first recognition result represents that the target object is not presented and the sound area corresponding to the first recognition result has a corresponding speech signal, and determining the sound area corresponding to the speech signal as the target sound area if it is recognized that the target object is presented.

12. The computer readable storage medium according to claim 7, wherein the performing the speech recognition on the at least one channel of to-be-recognized audio includes performing wakeup word recognition on the at least one channel of to-be-recognized audio;

the controlling a speech interaction-targeting device in the target sound area for speech interaction in the preset mode according to the recognition result includes:

determining a number of times at which a wakeup word in audio corresponding to the target sound area is recognized within preset duration; and starting a target object prohibition mode if the number of times is up to a preset frequency, wherein the target object prohibition mode is configured for prohibiting the target object to perform speech control of a target device by a preset control class.

13. An electronic device, including:

a processor;

a memory configured for storing an executable instruction for the processor, wherein the processor is configured for reading the executable instruction from the memory and executing the instruction to perform a speech interaction method including:

acquiring videos shot by a camera device in a target space and at least one channel of audio acquired by at least one audio acquisition device;

determining to-be-recognized audio that respectively corresponds to each of sound areas in the target space based on the at least one channel of audio;

determining a target sound area from the target space based on the video and at least one channel of to-be-recognized audio;

performing speech recognition on the at least one channel of to-be-recognized audio to obtain a recognition result; and controlling a speech interaction-targeting device in the target sound area for speech interaction in a preset mode according to the recognition result, wherein the determining to-be-recognized audio that respectively corresponds to each of the sound areas in the target space based on the at least one channel of audio includes:

preprocessing each of the at least one channel of audio so as to obtain at least one channel of preprocessed audio;

if a quantity of the at least one channel of audio is one, determining the obtained preprocessed audio as the to-be-recognized audio to which each of the sound areas correspond;

if the quantity of the at least one channel of audio is at least two, performing blind source separation on at least two channels of preprocessed audio so as to obtain at least two channels of separated audio; and matching the at least two channels of separated audio with the at least two channels of preprocessed audio so as to obtain the to-be-recognized audio to which the respective sound areas in the target space correspond.

14. The electronic device according to claim 13, wherein the controlling the speech interaction-targeting device in the target sound area for speech interaction in the preset mode according to the recognition result includes:

determining a sound area requesting for speech control from the target space;

determining a position relation between the sound area requesting for speech control and the target sound area; and controlling the speech interaction-targeting device in the target sound area for speech interaction in the preset mode according to the recognition result based on the position relation.

15. The electronic device according to claim 13, wherein the matching the at least two channels of separated audio with the at least two channels of preprocessed audio so as to obtain the to-be-recognized audio to which the respective sound areas in the target space correspond includes:

determining a similarity matrix based on the at least two channels of separated audio and the at least two channels of preprocessed audio, wherein elements in the similarity matrix are configured for representing similarity between the separated audio and the preprocessed audio;

determining a correspondence relation between the separated audio and the sound area in the target space based on the similarity matrix; and determining the to-be-recognized audio that respectively corresponds to each of the sound areas in the target space according to the correspondence relation.

16. The electronic device according to claim 13, wherein the determining the target sound area from the target space based on the video and at least one channel of to-be-recognized audio includes:

performing target object recognition on an image frame in the video so as to obtain a first recognition result that respectively corresponds to each of the sound areas in the target space; and determining the target sound area from the target space based on the first recognition result that respectively corresponds to each of the sound areas.

17. The electronic device according to claim 13, wherein the performing the speech recognition on the at least one channel of to-be-recognized audio includes performing wakeup word recognition on the at least one channel of to-be-recognized audio;

the controlling a speech interaction-targeting device in the target sound area for speech interaction in the preset mode according to the recognition result includes:

determining a number of times at which a wakeup word in audio corresponding to the target sound area is recognized within preset duration; and starting a target object prohibition mode if the number of times is up to a preset frequency, wherein the target object prohibition mode is configured for prohibiting the target object to perform speech control of a target device by a preset control class.

* * * * *